R. C. PIERCE.
BONDED WIRE CABLE STRUCTURE AND METHOD OF MAKING THE SAME.
APPLICATION FILED OCT. 20, 1919.
1,339,417.
Patented May 11, 1920.
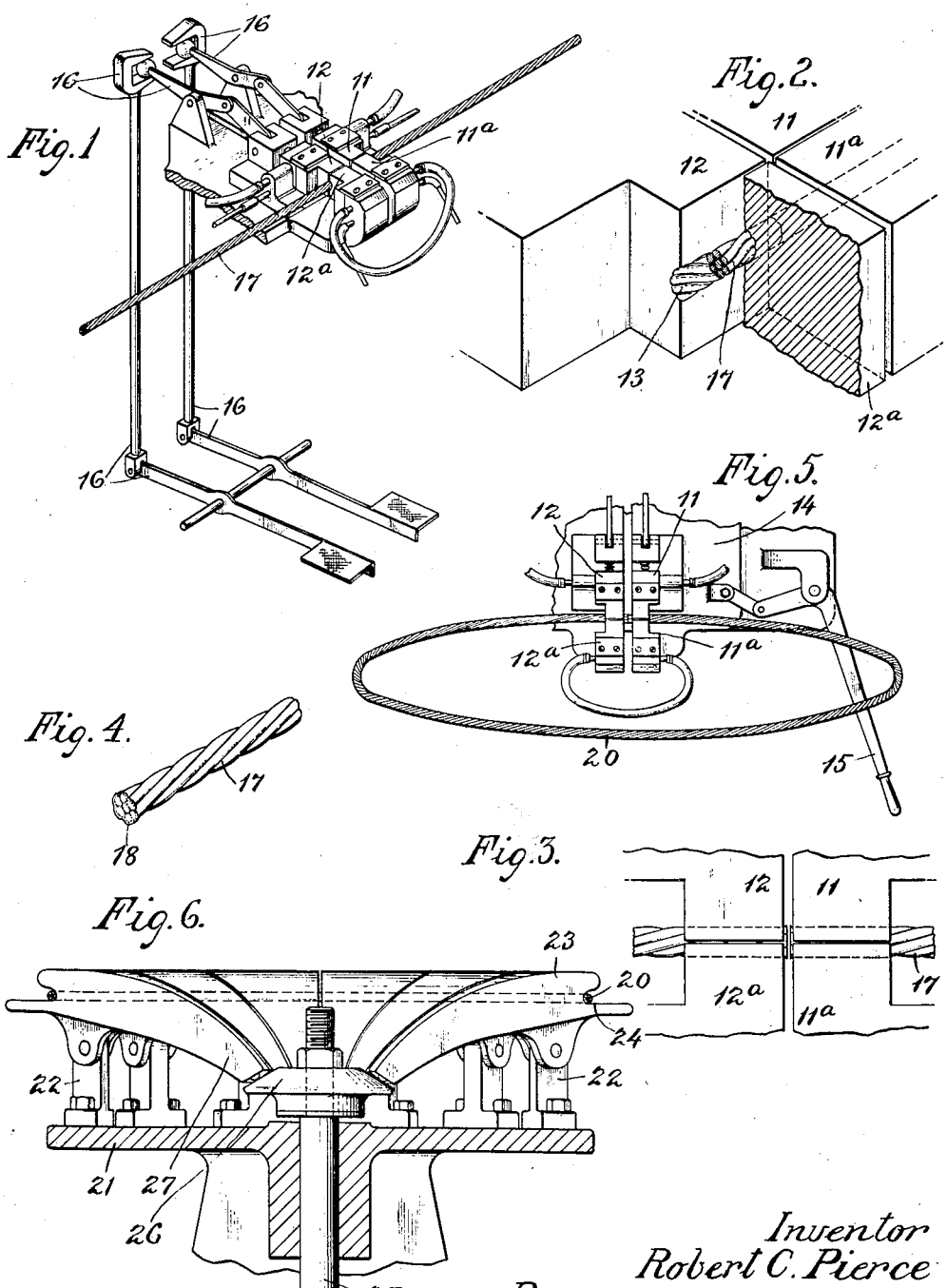
Inventor
Robert C. Pierce
By Robert M. Pierson,
Atty.

UNITED STATES PATENT OFFICE.

ROBERT C. PIERCE, OF AKRON, OHIO, ASSIGNOR TO THE B. F. GOODRICH COMPANY, OF NEW YORK, N. Y., A CORPORATION OF NEW YORK.

BONDED-WIRE-CABLE STRUCTURE AND METHOD OF MAKING THE SAME.

1,339,417.  Specification of Letters Patent.  Patented May 11, 1920.

Application filed October 20, 1919. Serial No. 331,991.

*To all whom it may concern:*

Be it known that I, ROBERT C. PIERCE, a citizen of the United States, residing at Akron, in the county of Summit and State of Ohio, have invented a certain new and useful Bonded - Wire - Cable Structure and Method of Making the Same, of which the following is a specification.

This invention relates to the treatment of wire cables, and its principal objects are to furnish improved means for severing a piece of desired length from a cable of greater length, preventing the fraying of the strands at the end or ends, and joining such a cable end to another part, or to the other end of the same piece to form for example an endless ring or hoop. My invention comprises certain steps constituting a novel method or methods, and also includes an improved product or products.

Of the accompanying drawings:

Figure 1 is a perspective view of a portion of an electrical fusion apparatus adapted to carry out my invention.

Fig. 2 is a perspective view of the cable-gripping jaws, a part of one jaw being broken away to show the cable end in position.

Fig. 3 is a partial plan view of the jaws showing a cable after it has been severed.

Fig. 4 is a perspective view of a cable end with the strands integrally bonded.

Fig. 5 is a fragmentary plan view of a part of the electrical fusion apparatus used as a welding machine with a cable length in position for welding its ends to form an endless ring.

Fig. 6 is a sectional view through a stretching and sizing apparatus with a ring in place thereon.

In these drawings I have shown for illustrative purposes a well-known form of butt-welding machine on which the operations of cutting, bonding and welding cable ends may be performed in accordance with my invention, but it will be understood that any other suitable form of apparatus may be employed for performing the several steps. This welding machine has two pairs of gripping jaws, 11, 11$^a$ and 12, 12$^a$ provided with cable-receiving recesses 13, each pair constituting a clamp or gripper for one end of a cable, and one pair, 11, 11$^a$ being mounted on a plate 14 movable longitudinally of the work by means of a lever 15 in order to vary the spacing of the two clamps. One of each pair of jaws, as 11, 12, is mounted for transverse movement with respect to the other jaw to grip and release the cable, the gripping movement being effected by means of a pair of actuating devices 16 including suitable links, levers, rods and pedals, and the releasing movement being effected by gravity. The grippers constitute electrodes which are included in the secondary circuit of a transformer.

I preferably form a transverse bond or weld between the ends of the strands, at the same time that the cable is cut in two, by performing a single operation which gives both results. In this operation the jaws 11, 12 are set relatively close together (Fig. 3), the cable 17 is securely gripped between the jaws and a heavy electrical current is passed from one electrode through the short intervening portion of the cable to the other electrode to fuse the cable in two. The molten metal flows laterally over the cable ends, and when it cools it forms a thin disk-like terminal bond or weld 18 between the strand ends, being meanwhile securely held in the grippers so that the strands are prevented from springing apart while the fused metal is hardening. In this way, the cable is readily cut into pieces of any desired length, and at the same time its newly-formed terminal portions are transversely bonded to prevent fraying, without the addition of other metal.

A cable end thus bonded is well adapted for use in various ways, and will form a more perfect joint with a similar cable end or other part if it is desired to create such a joint by welding. Thus, the two integrally-bonded ends of one length of cable may be connected to form a ring 20 as illustrated in Fig. 5. In making these welds the pairs of jaws are preferably set apart farther than during the cable cutting operation, the ends to be welded are clamped between the jaws in abutting relation, and the current turned on momentarily, the lever 14 being operated to keep the cable ends in contact as the metal on the ends is fused. The jaws are then released, the weld cooled and the flash or fin around the joint removed.

In certain cases it is desirable to form the ring with a predetermined circumference as in the formation of rings for bead cores for pneumatic tire casings, in which case the length of cable cut off is slightly less than the desired circumference, the ring made from this length being stretched to the desired size, the stretching serving also to test the joint. This stretching is done on a machine having a circular bed-plate 21 carrying in a circle a series of pivot-lugs 22 for a series of rocking levers or stretching blocks 23, the latter having a circumferential groove 24 to receive the ring 20. A rod 25 bearing a conical head 26 is regularly reciprocated along the axis of the bed against the inwardly-projecting ends 27 of the blocks 23, thereby rocking the latter on their pivots to stretch the ring and then to release it to permit the substitution of a new ring.

The disk-like bond 18 on the cable end provides a continuous, even surface for welding purposes, and a weld formed on this cable end is stronger than if the ends were not so bonded, for the disk is of the same material as the strands, keeps the ends of the latter from separating and if the bond is formed at the same time the strands are cut off, keeps the core strand or strands from drawing inwardly, as sometimes occurs when the cable is cut by a saw or thin emery disk. A ring for bead cores made by this method is stronger and the breakage in the stretching and sizing step is largely reduced because a welded joint made with the transversely-bonded ends is better able to stand the stretching.

I am aware that it has been proposed to electrically butt-weld a wire cable to a solid end-piece of metal to prevent the cable from untwisting and I do not include such a process within my present invention, which relates, so far as the end bonding is concerned, to the bonding of a cable terminal or extremity with its own fused strand metal.

I claim:

1. The method of securing stranded cable ends against fraying which comprises fusing the strand metal at the cable end, causing the fused portions of neighboring strands to coalesce, and then cooling the fused strand metal to form an integral bond constituting the end face of the cable.

2. The method of securing stranded cable ends against fraying which comprises clamping the cable at a point closely adjacent to the bonded end to be formed thereon, in such manner as to hold its strands from untwisting, fusing an integral end-face of strand metal thereon and allowing the fused metal to set while the cable is so held.

3. The method of transversely bonding stranded cable ends which comprises passing an electric current through said cable, thereby fusing the strands at a point constituting the end face of the cable, and cooling the fused metal to form an integral terminal bond.

4. The method of cutting a stranded cable and bonding together the strands at the two cut ends which comprises melting the cable apart and causing a flow and cooling of the melted strand metal to form the bonds.

5. The herein-described method which comprises clamping a wire cable at two closely-adjacent points, melting it apart between the clamped portions and allowing the fused portions to cool and form integral end bonds while the cable is so clamped.

6. The method of cutting a stranded cable and bonding together the strands at the two cut ends which comprises passing an electric current through the cable at the point where it is to be cut, thereby melting it apart and causing the fused metal to flow over the cable ends, and cooling the fused metal to form the bonds.

7. The herein-described method which comprises clamping a wire cable at two closely adjacent points, passing a heavy electric current through the clamps and the intervening portion of cable to melt the latter in two, and causing the fused strand metal to cool and form integral end bonds while the cable is held in the clamps.

8. The process of making wire cable rings which comprises cutting off and bonding the ends of a cable length by melting the cable apart, thereby causing a flow of metal over the strand ends, cooling the fused metal to form bonds on the ends of the cable length, and welding the bonded ends of the cable length together.

9. The process of making wire cable rings of predetermined size which comprises melting off from a piece of greater length, a portion of cable having a length slightly less than the desired circumference, bonding the ends by the melting operation followed by cooling, welding the ends together to form a ring, and expanding the welded ring to the desired size by an outward radial stretching action exerted simultaneously at various points throughout its circumference.

10. The herein-described method of making wire cable rings which comprises melting off from a piece of greater length, by means of a heavy electric current passed therethrough, a portion of cable having a length slightly less than the desired circumference, thereby at the same time forming integral bonds of strand metal on the ends, bringing together two such ends on said portion of cable and electrically butt-welding them to each other, and then stretching the resulting ring to the desired size.

11. A wire cable having an integral bond constituting the end face thereof and formed of the fused metal of the strands.

12. A wire cable terminal at whose extremity the strands are bonded by a thin disk of strand metal formed integrally with said strands.

In witness whereof I have hereunto set my hand this 13th day of October, 1919.

ROBERT C. PIERCE.